United States Patent
Wu et al.

(10) Patent No.: US 11,915,379 B2
(45) Date of Patent: Feb. 27, 2024

(54) DISPLAY IMAGE ADJUSTMENT METHOD AND AUGMENTED REALITY DISPLAY DEVICE

(71) Applicant: Coretronic Corporation, Hsin-Chu (TW)

(72) Inventors: Shih-Min Wu, Hsin-Chu (TW); Yi-Fa Wang, Hsin-Chu (TW); Ping-Chen Ma, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/720,305

(22) Filed: Apr. 14, 2022

(65) Prior Publication Data
US 2022/0366652 A1    Nov. 17, 2022

(30) Foreign Application Priority Data

May 11, 2021    (CN) .......................... 202110508965.1

(51) Int. Cl.
*G06T 19/00* (2011.01)
*G02B 27/01* (2006.01)
*G06F 3/01* (2006.01)
*G06T 7/33* (2017.01)

(52) U.S. Cl.
CPC ........ *G06T 19/006* (2013.01); *G02B 27/0172* (2013.01); *G06F 3/011* (2013.01); *G06T 7/33* (2017.01); *G02B 2027/0178* (2013.01)

(58) Field of Classification Search
None
See application file for complete search history.

(56) References Cited

U.S. PATENT DOCUMENTS

| 2014/0098102 | A1* | 4/2014 | Raffle .................. G06F 40/103 345/440 |
| 2016/0048211 | A1* | 2/2016 | Raffle ..................... G06F 3/013 715/863 |

FOREIGN PATENT DOCUMENTS

| CN | 105589197 | 5/2016 |
| CN | 105843390 | 8/2016 |
| TW | 201604587 | 2/2016 |

* cited by examiner

*Primary Examiner* — Christopher J Kohlman
(74) *Attorney, Agent, or Firm* — JCIPRNET (57) ABSTRACT

The disclosure provides a display image adjustment method and an augmented reality display device. The display image adjustment method includes the following steps. Received image data is converted to a coordinate system of the augmented reality display device to obtain initial coordinate information. An initial image is provided to an active display region of the augmented reality display device based on the initial coordinate information. The initial coordinate information is adjusted in a virtual adjustment coordinate region to obtain adjusted coordinate information when an adjustment command is received. An adjusted image is provided to the active display region of the augmented reality display device based on the adjusted coordinate information. The display image adjustment method and the augmented reality display device proposed by the disclosure may adjust display content of the AR display device according to user's needs.

8 Claims, 7 Drawing Sheets

DISPLAY IMAGE ADJUSTMENT METHOD AND AUGMENTED REALITY DISPLAY DEVICE

CROSS-REFERENCE TO RELATED APPLICATION

This application claims the priority benefit of China application serial no. 202110508965.1, filed on May 11, 2021. The entirety of the above-mentioned patent application is hereby incorporated by reference herein and made a part of this specification.

BACKGROUND

Technical Field

The disclosure relates to a display image adjustment mechanism, and in particular to a display image adjustment method and an augmented reality display device.

Description of Related Art

With the advancement of technology, Augmented Reality (AR) technology, which combines virtual world and real world scenes, has been developed. AR technology is a highly visual and interactive way to present relevant digital information in a physical environment. In terms of hardware, a device that combines a processor, a display, a sensor, and an input device can become an AR device. Currently, AR technology can be implemented in optical projection systems, monitors, mobile devices, head-mounted displays, heads-up displays, computers, etc.

In devices such as AR glasses, where a large display screen cannot be set up, users can overcome the problem of small image content or small subtitles by zooming in the image to see the content clearly. However, after zooming in on the display region, the display region can only show part of the content, and the display content cannot be further adjusted. Therefore, it is not convenient to adjust the display image to view the contents through the small size display screen.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a display image adjustment method and an augmented reality (AR) display device, capable of adjusting display content of the augmented reality display device according to user's needs.

A display image adjustment method of the disclosure is suitable for an augmented reality display device, and includes the following. Received image data is converted to a coordinate system of the augmented reality display device to obtain initial coordinate information. An initial image is provided to an active display region of the augmented reality display device based on the initial coordinate information. The initial coordinate information is adjusted in a virtual adjustment coordinate region to obtain adjusted coordinate information when an adjustment command is received. The active display region is located in the virtual adjustment coordinate region. An adjusted image is provided to the active display region of the augmented reality display device based on the adjusted coordinate information.

An augmented reality display device of the disclosure includes the following. An image processor is configured to receive image data from a signal source. An operating unit is configured to input an adjustment command. A controller is coupled to the operating unit and the image processor, and is configured to determine whether the operating unit inputs the adjustment command, and transmit the adjustment command to the image processor. The image processor is configured to convert the received image data to a coordinate system of the augmented reality display device to obtain initial coordinate information; provide an initial image to an active display region of the augmented reality display device based on the initial coordinate information; adjust the initial coordinate information in a virtual adjustment coordinate region to obtain adjusted coordinate information when the adjustment command is received, where an area of the virtual adjustment coordinate region is larger than an area of the active coordinate region; and provide an adjusted image to the active display region of the augmented reality display device based on the adjusted coordinate information.

Based on the above, the disclosure may adjust the content of the display region of the augmented reality display device according to the user's needs, and the display image may be moved in any position to allow the user to see the content more clearly, or to avoid the display image blocking the user's view.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "Coupled," and "mounted," and variations thereof herein are used broadly and encompass direct and indirect connections, couplings, and mountings.

The foregoing and other technical content, features and effects of the disclosure will be clearly presented in the following detailed description of a preferred embodiment with reference to the drawings. The directional terms mentioned in the following embodiments, for example: up, down, left, right, front or back, etc., are only directions with reference to the drawings. Therefore, the directional terms used are intended to illustrate and not to limit the disclosure.

Figure 1:
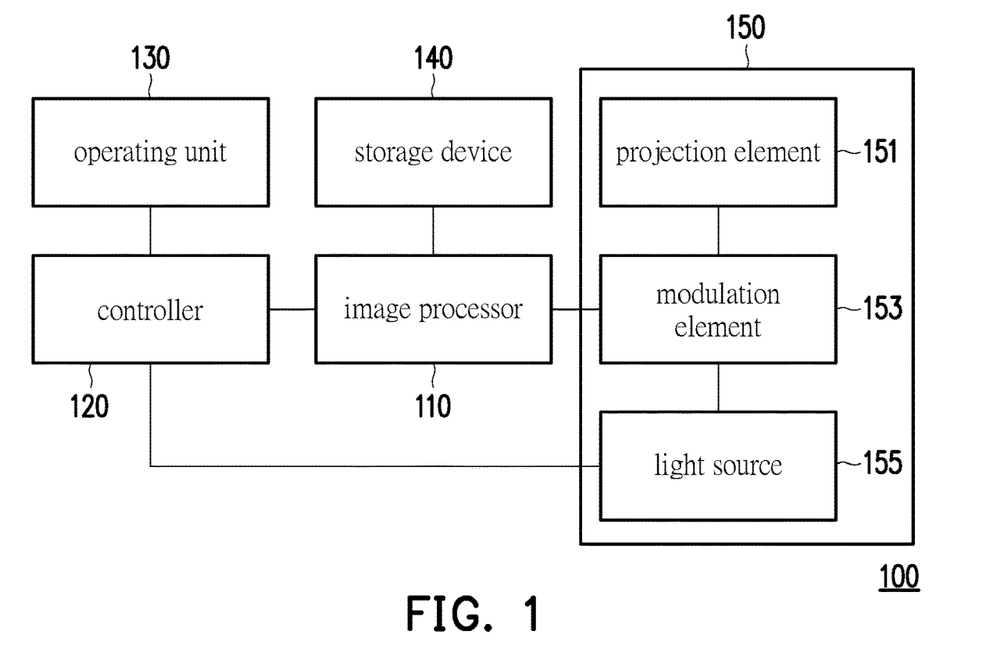
FIG. 1 is a block diagram of an augmented reality display device according to an embodiment of the disclosure.

FIG. 1 is a block diagram of an augmented reality (AR) display device according to an embodiment of the disclosure. Referring to FIG. 1, an augmented reality display device 100 (hereinafter referred to as an AR display device) includes an image processor 110, a controller 120, and an operating unit 130, and may optionally include a storage device 140 and a projection device 150. The image processor 110 is coupled to the controller 120, the storage device 140, and the projection device 150. The controller 120 is coupled to the operating unit 130.

The image processor 110 may be hardware (e.g., a chipset, a processor, etc.), a software component (e.g., an operating system, an application program, etc.), or a combination of hardware and software components, with computing and processing capabilities. The image processor 110 is, for example, a central processing unit (CPU), a graphics processing unit (GPU), or other programmable microprocessor, digital signal processor (DSP), programmable controller, application-specific integrated circuits (ASIC), programmable logic device (PLD) or other similar devices. The image processor 110 is adapted to receive image data from a signal source (not shown), to coordinate the image data and to convert the image data. For example, the image processor 110 may resize the image data to conform to an image size in an active coordinate region (e.g., resize and scale the image, or maintain the image scale and resize the image), and coordinate the image data (e.g., label coordinates of a starting point of the image data and sizes of the image data). The active coordinate region is located in a virtual adjustment coordinate region, and the active coordinate region corresponds to an active display region of the AR display device 100, i.e., a region where the AR display device 100 allows the user to view the image.

The controller 120 is, for example, a chipset, configured to determine whether the operating unit 130 has input an adjustment command, and the controller 120 transmit the adjustment command to the image processor 110 after receiving the adjustment command from the operating unit 130.

The operating unit 130 includes at least one button for inputting the adjustment command. For example, the button may include a zoom adjustment button for scaling the image (zoom in, zoom out), and a shift adjustment button for adjusting image positions (up, down, left, right, and position return), etc.

The storage device 140 is, for example, any type of fixed or removable random access memory, read-only memory, flash memory, secure digital card, hard disk or other similar devices or a combination of the devices. Multiple code snippets are stored in the storage device 140, and the code snippets, after being installed, are executed by the image processor 110 to perform the display image adjustment method.

The projection device 150 is coupled to the controller 120 and the image processor 110, and the projection device 150 is configured to project an initial image and an adjusted image.

The projection device 150 includes a projection element 151, a modulation element 153 and a light source 155. The modulation element 153 is disposed between the projection element 151 and the light source 155. The image processor 110 is coupled to the modulation element 153. The controller 120 is coupled to the light source 155. The projection element 151 is, for example, a waveguide, and the modulation element 153 is, for example, a digital micromirror device (DMD). According to an embodiment, the AR display device 100 is, for example, smart glasses, displayed in a projection mode, projecting light onto the user's eyes through the projection device 150 to present the image.

The controller 120 transmits the adjustment command to the image processor 110 according to operation (zoom adjustment, shift adjustment) of the operating unit 130. The image processor 110 adjusts initial coordinate information according to the adjustment command to generate adjusted image data, and transmits the adjusted image data to the modulation element 153 of the projection device 150. The modulation element 153 modulates light emitted by the light source 155 based on the adjusted image data to generate an image beam (i.e., the adjusted image), and then projects the image beam to the user's eye through the projection element 151.

Figure 2:
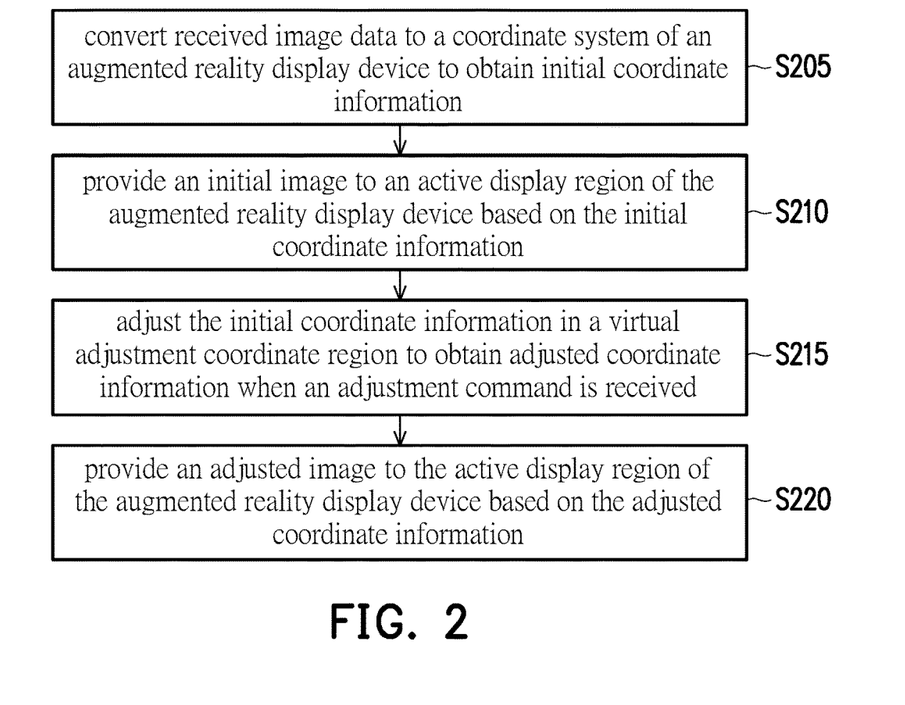
FIG. 2 is a flowchart of a display image adjustment method according to an embodiment of the disclosure.

In detail, FIG. 2 is a flowchart of a display image adjustment method according to an embodiment of the disclosure. Referring to FIG. 1 and FIG. 2 at the same time, a display image adjustment method of the disclosure is suitable for an augmented reality display device 100. In step S205, the image processor 110 receives and converts an image data to a coordinate system of the AR display device 100 to obtain initial coordinate information. Specifically, the initial coordinate information is used to indicate a coordinate position of the image data (e.g., the image data starts at coordinates (0, 0) and the image data has a size of 100*100). Next, in step S210, the image processor 110 provides an initial image to an active display region of the AR display device 100 based on the initial coordinate information. Specifically, the image processor 110 generates initial image data based on the initial coordinate information and the image data, and transmits the initial image data to the modulation element 153 of the projection device 150, so that the initial image is presented in the active display region of the AR display device 100. In particular, the active display region is a region where the AR display device 100 allows the user to view an image.

In step S215, the image processor 110 adjusts the initial coordinate information in a virtual adjustment coordinate region to obtain adjusted coordinate information when the adjustment command is received. Here, an active coordinate region corresponds to the active display region of the AR display device 100, and the active coordinate region is located in the virtual adjustment coordinate region. That is, an area of the active coordinate region is smaller than an area of the virtual adjustment coordinate region. For example, the area of the virtual adjustment coordinate region is N times the area of the active coordinate region, where 1<N≤9.

For example, according to an embodiment, the adjustment command is a shift command. When the image processor 110 receives the shift command, the image processor 110 shifts the initial image data in the virtual adjustment coordinate region in a moving direction indicated by the shift command to obtain the adjusted coordinate information (e.g., the shift command is to shift n units to the right, i.e., the coordinates of the starting point are shifted from (0, 0) to a position of (n, 0)).

According to one embodiment, the adjustment command is a zoom command. Here, zoom-in and zoom-out functions of the display image are mainly used to adjust resolution. That is, the image processor 110, upon receiving the zoom command, performs a resolution conversion of the image data (initial coordinate information) to convert the initial coordinate information of a first size (M1×N1) to the adjusted coordinate information of a second size (M2×N2). A center point of the initial coordinate information of the first size (M1×N1) overlaps a center point of the adjusted coordinate information of the second size. For example, the image processor 110, upon receiving a zoom-in command, decreases the resolution of the image data to magnify the presented image.

According to one embodiment, the adjustment command may also include both a shift command and a zoom command.

After that, in step S220, the image processor 110 provides an adjusted image to the active display region of the AR display device 100 based on the adjusted coordinate information. Specifically, the image processor 110 generates adjusted image data based on the adjusted coordinate information and the image data, and transmits the adjusted image data to the modulation element 153 of the projection device 150, so that the adjusted image is presented in the active display region of the AR display device 100. In particular, if a size of the adjusted image is smaller than a size of the active display region, a block in the active display region where the adjusted image is not displayed is set to see through. If the coordinate position of some of the image data after adjustment is outside the active coordinate region, the adjusted image data will be generated only from the image data located within the active coordinate region, but the disclosure is not limited thereto. According to other embodiments, if the coordinate position of some of the image data after adjustment is outside the active coordinate region, the adjusted image data may be generated using all of the image data after adjustment, and the modulation element 153 receives only the adjusted image data corresponding to the active display region or the modulation element 153 modulates the light emitted by the light source 155 to generate an image beam based only on the adjusted image data corresponding to the active display region.

Figure 3:
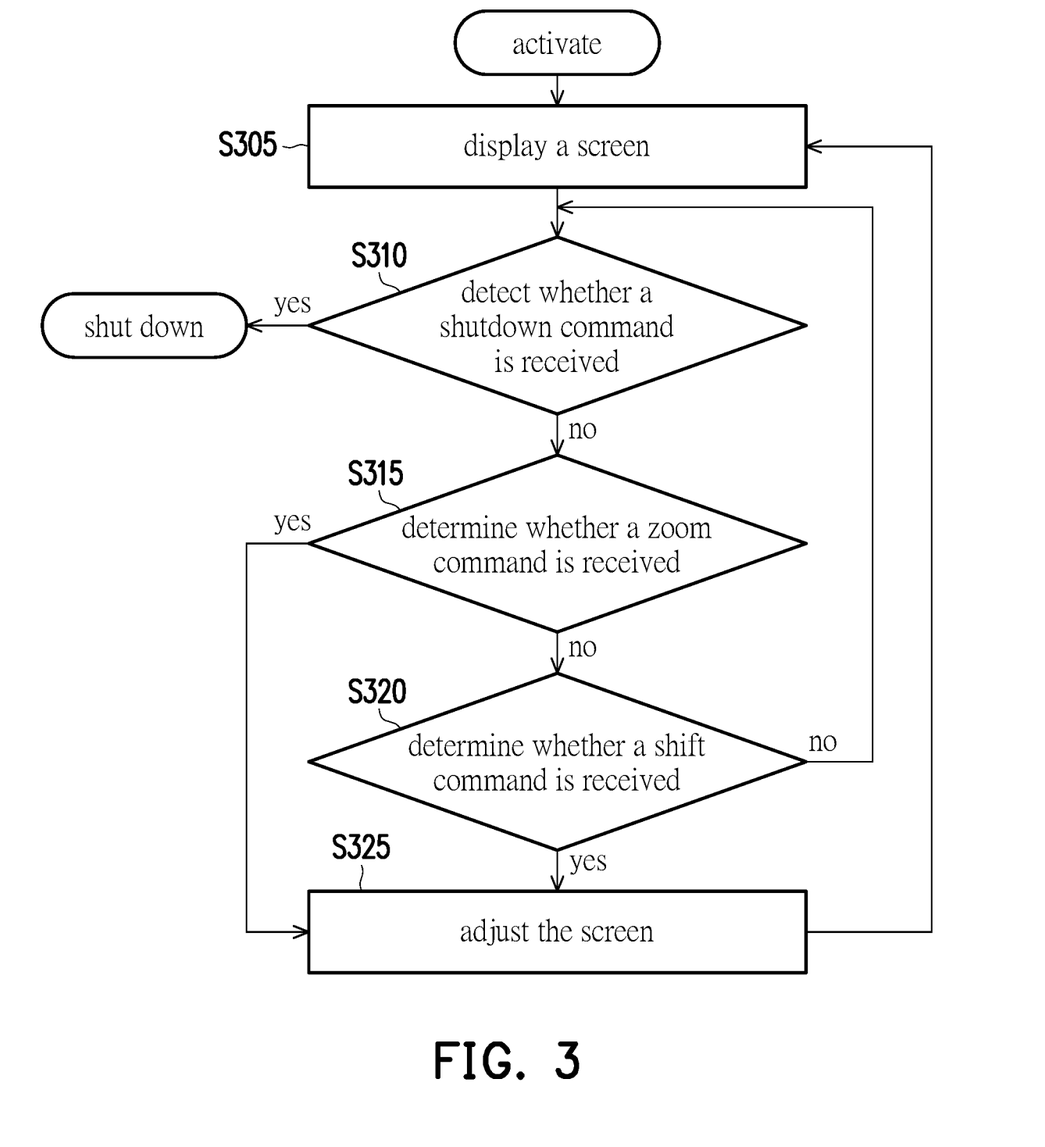
FIG. 3 is a flowchart of a display image adjustment method of an image processor according to an embodiment of the disclosure.
Figure 4A:
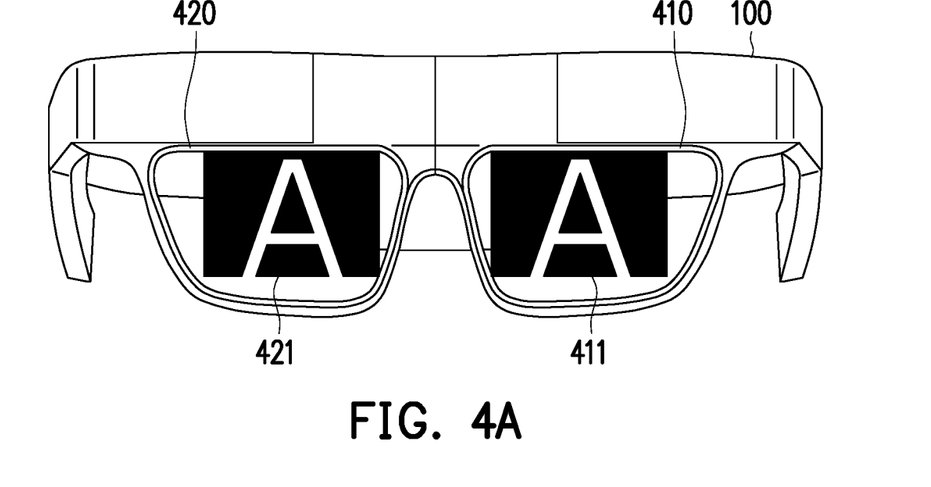
FIG. 4A is a schematic diagram of an augmented reality display device according to an embodiment of the disclosure.
Figure 4B:
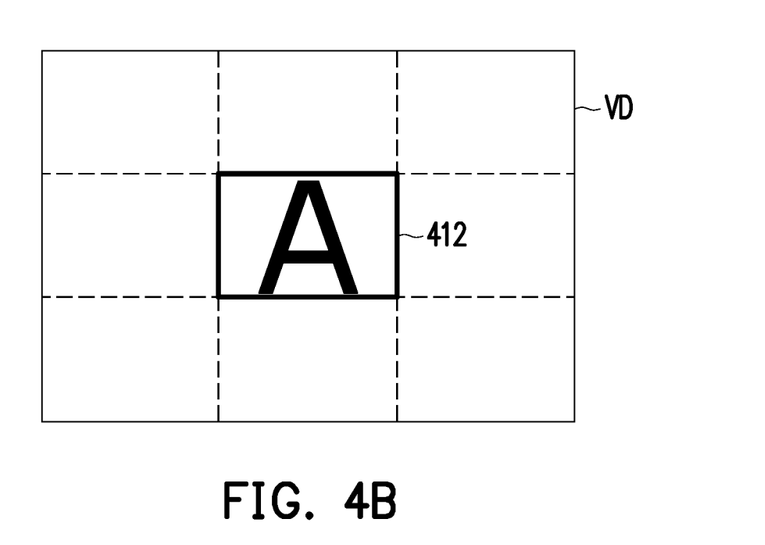
FIG. 4B is a schematic diagram of an active display region and a virtual adjustment coordinate region according to an embodiment of the disclosure.

FIG. 3 is a flowchart of a display image adjustment method of an image processor according to an embodiment of the disclosure. FIG. 4A is a schematic diagram of an AR display device according to an embodiment of the disclosure. FIG. 4B is a schematic diagram of an active display region and a virtual adjustment coordinate region according to an embodiment of the disclosure. According to examples shown in FIG. 4A and FIG. 4B, the AR display device 100 is AR glasses, which includes two lenses 410 and 420 on the left and right, and has active display regions 411 and 421 in the lenses 410 and 420, respectively. The lens 410 has an active coordinate region 412 corresponding to the active display region 411 and a virtual adjustment coordinate region VD for adjusting the display image as shown in FIG. 4B. According to this embodiment, the virtual adjustment coordinate region VD is 9 times the active coordinate region 412. The lens 420 is also set as the lens 410. In particular, in FIG. 4B, a white region is a no-image region, and a gray region (as shown as "A" in FIG. 4B) is an image region, which is the same as a general image labeling. In FIG. 4A, in the active display regions 411 and 421 of the AR glasses of the AR display device 100, a gray region is a no-image region (i.e., no image beam is provided), and a white region is an image region (i.e., an image beam is provided), so that the gray region of the active display regions 411 and 421 of the AR glasses of the AR display device 100 may be regarded as a see-through region.

Referring to FIG. 1, FIG. 3, FIG. 4A, and FIG. 4B at the same time, after the AR display device 100 is activated, in step S305, an initial image is displayed. Specifically, when the image processor 110 receives a boot command, the image processor 110 reads display settings stored in previous shutdown of the AR display device 100, and converts the image data to the coordinate system of the AR display 100 based on the display settings to obtain the initial coordinate information, and displays the initial image accordingly, i.e., provides the initial image (image beam) to the active display region 411 and 421 of the AR display device 100.

Next, in step S310, the image processor 110 detects whether a shutdown command is received. If the shutdown command is received, the AR display device 100 is shut down, and if the shutdown command is not received, steps S315 to S325 are executed. Here, the order of step S315 and step S320 is not limited.

In step S315, the image processor 110 determines whether a zoom command is received from the controller 120. After receiving the zoom command, in step S325, the image is adjusted. That is, the image processor 110 performs the resolution conversion on the image data to convert the initial coordinate information of the first size (M1×N1) to the adjusted coordinate information of the second size (M2×N2). Moreover, the image processor 110 returns to step S305, according to the adjusted coordinate information, the adjusted image is provided to the active display region of the AR display device 100. After that, step S310 is executed.

If the zoom command is not received, in step S320, the image processor 110 determines whether a shift command is received from the controller 120. After receiving the shift command, in step S325, the image is adjusted. That is, the image processor 110 shifts the initial coordinate information in a moving direction indicated by the shift command to obtain the adjusted coordinate information. Moreover, the image processor 110 returns to step S305, according to the adjusted coordinate information, the adjusted image is provided to the active display region of the AR display device 100. After that, step S310 is executed. If the shift command is not received, the image processor 110 returns to step S310, and continue to detect whether a shutdown command is received.

Figure 5A:
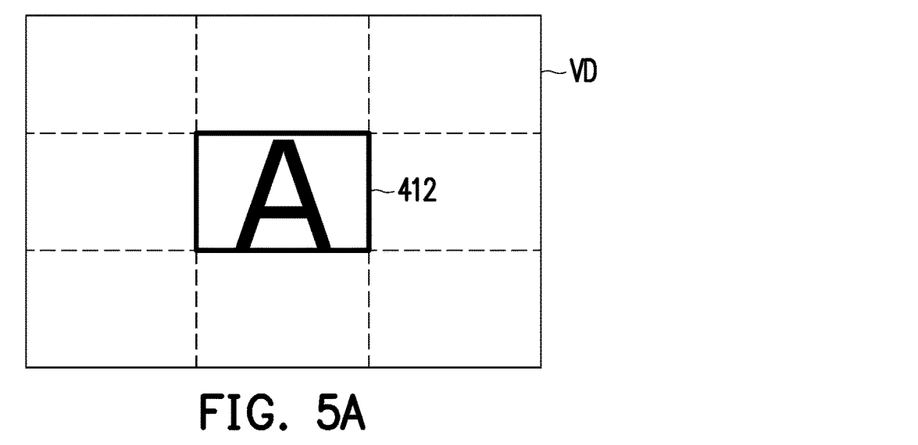
FIG. 5A to FIG. 5C are schematic diagrams of adjusting images according to an embodiment of the disclosure.
Figure 5B:
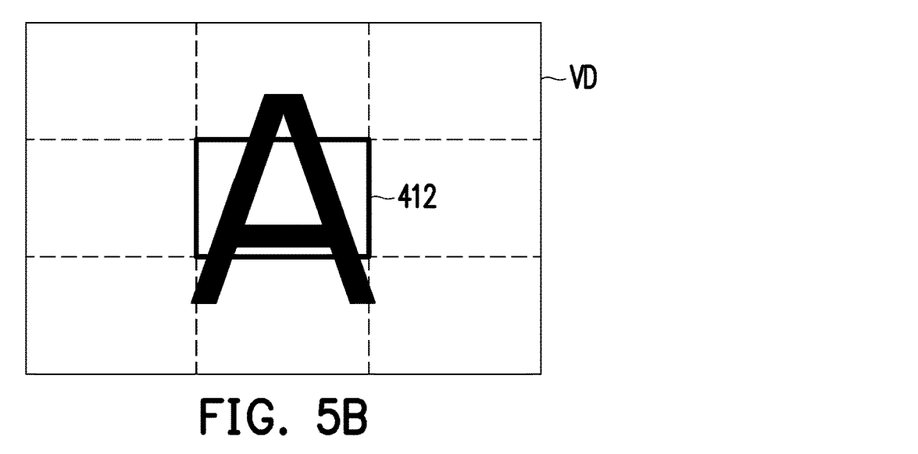
Figure 5C:
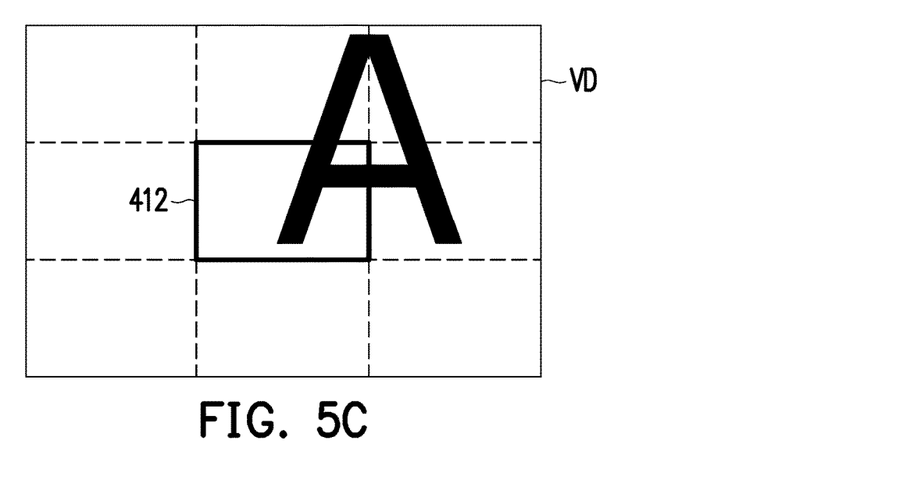
Figure 6A:
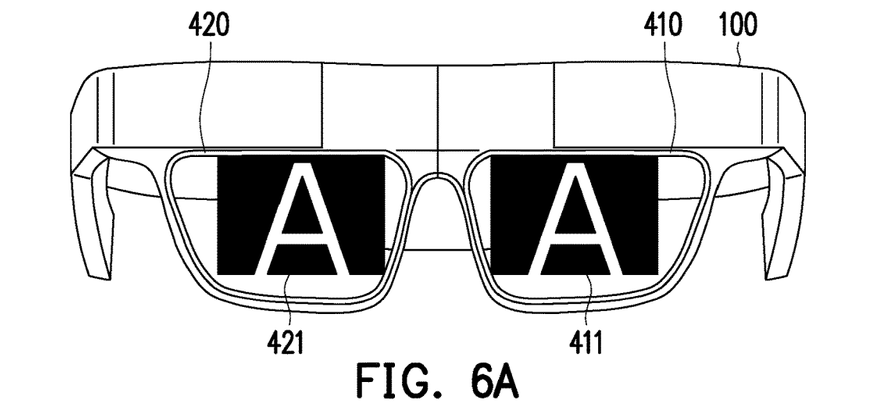
FIG. 6A to FIG. 6C are schematic diagrams of adjusting images in an active display region of an augmented reality display device according to an embodiment of the disclosure.
Figure 6B:
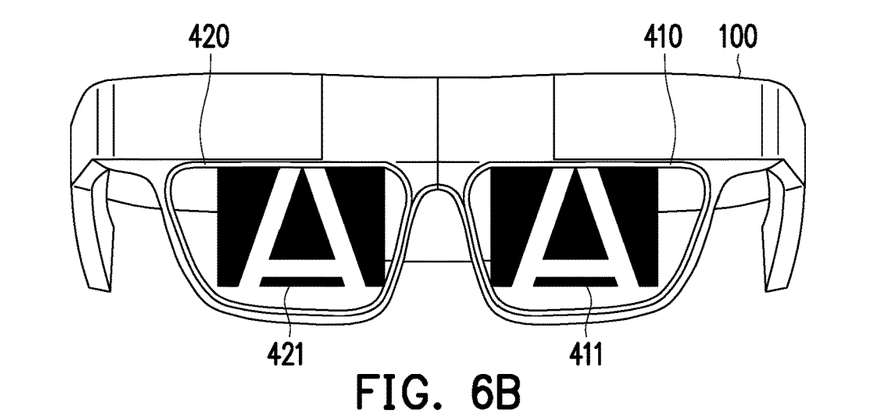
Figure 6C:
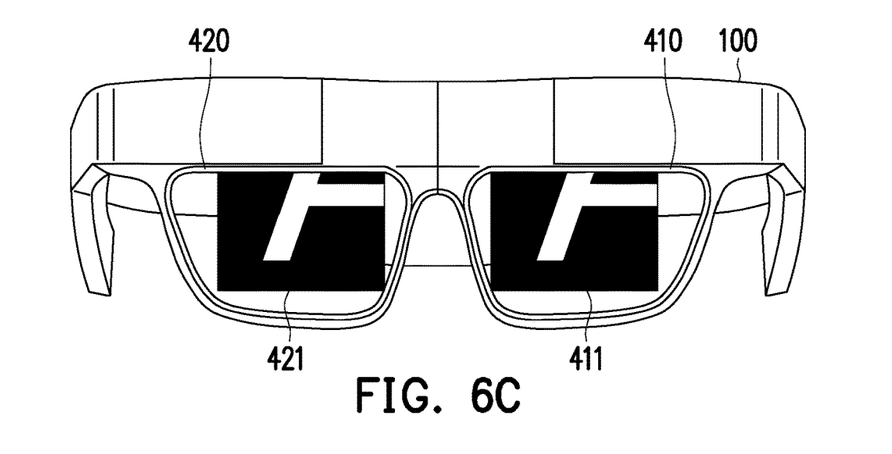

FIG. 5A to FIG. 5C are schematic diagrams of adjusting images according to an embodiment of the disclosure. FIG. 6A to FIG. 6C are schematic diagrams of adjusting images in an active display region of an AR display device according to an embodiment of the disclosure. According to this embodiment, only the active display region 411 of FIG. 6A to FIG. 6C is illustrated by FIG. 5A to FIG. 5C, and the active display region 421 has the same settings as the active display region 411, and therefore will not be repeated in the following.

According to embodiments shown in FIG. 5A to FIG. 5C and FIG. 6A to FIG. 6C, after the AR display device 100 is turned on, as shown in FIG. 6A, the active display regions 411 and 421 respectively display image data letter "A". In the active display regions 411 and 421, black regions are all see-through regions except for the letter "A".

Next, when the user presses a zoom-in adjustment button to perform a zoom-in operation on the image data, the letter "A" in the active coordinate region 412 (as shown in FIG. 5A) is zoomed in based on a center of the active coordinate region 412 (as shown in FIG. 5B), and the adjusted image is provided to the active display region 411 of the AR display device 100 (as shown in FIG. 6B). At this time, when the letter "A" has been zoomed in beyond the active coordinate region 412, the user may press the shift adjustment button to perform upward and rightward shift operations on the zoomed-in image data (as shown in FIG. 5C), and the adjusted image is provided to the active display region 411 of the AR display device 100 (as shown in FIG. 6C). In this way, the user may move the display content at will and view further details of the display content.

Figure 7A:
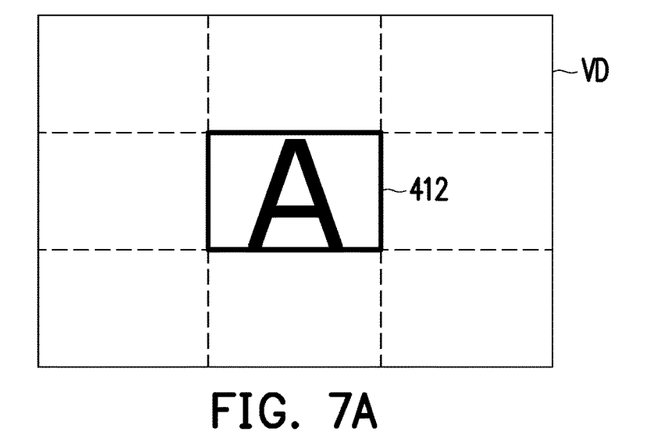
FIG. 7A to FIG. 7C are schematic diagrams of adjusting images according to an embodiment of the disclosure.
Figure 7B:
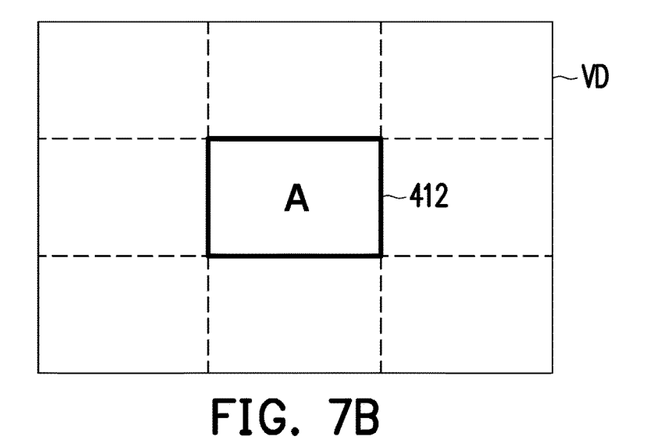
Figure 7C:
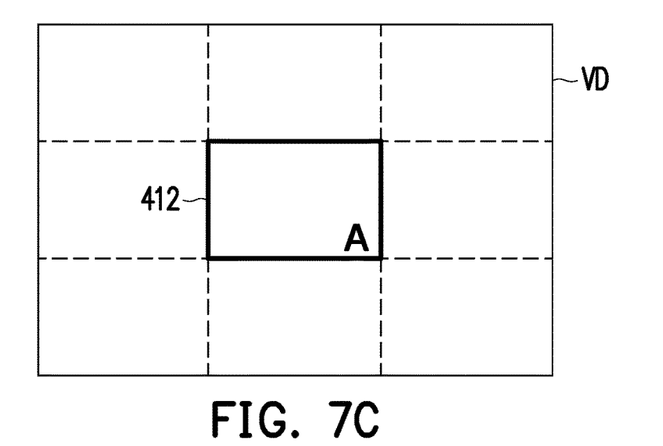
Figure 8A:
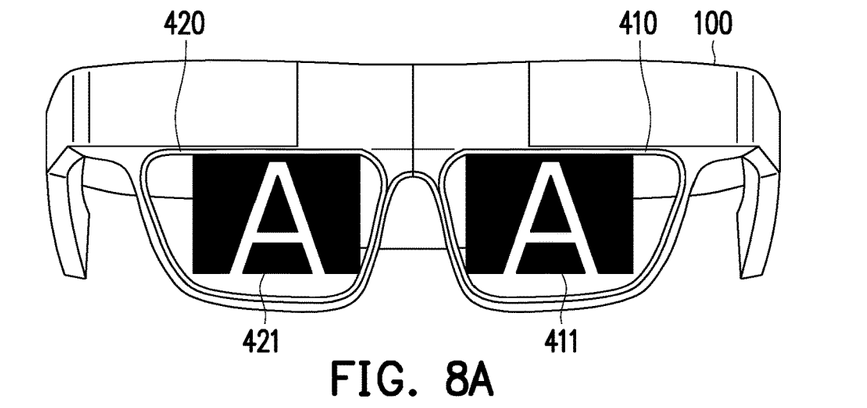
FIG. 8A to FIG. 8C are schematic diagrams of adjusting images in an active display region of an augmented reality display device according to an embodiment of the disclosure.
Figure 8B:
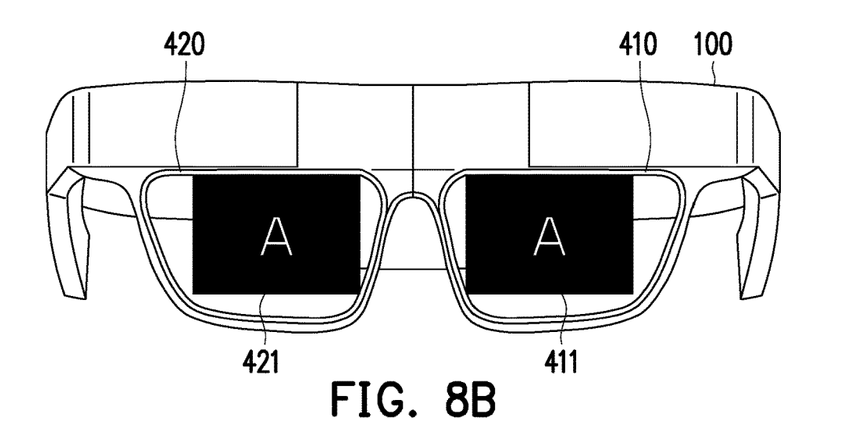
Figure 8C:
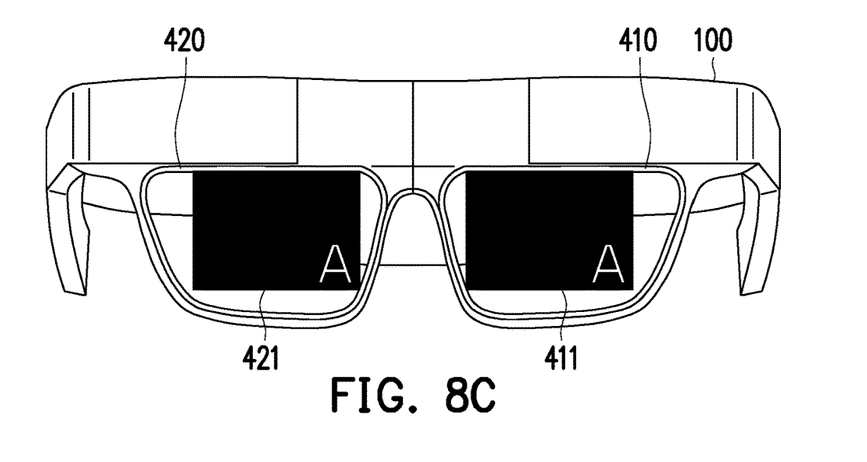

FIG. 7A to FIG. 7C are schematic diagrams of adjusting images according to an embodiment of the disclosure. FIG. 8A to FIG. 8C are schematic diagrams of adjusting images in an active display region of an AR display device according to an embodiment of the disclosure. According to this embodiment, only the active display region 411 of FIG. 8A to FIG. 8C is illustrated by FIG. 7A to FIG. 7C, and the active display region 421 has the same settings as the active display region 411, and therefore will not be repeated in the following.

According to embodiments shown in FIG. 7A to FIG. 7C and FIG. 8A to FIG. 8C, after the AR display device 100 is turned on, as shown in FIG. 8A, the active display region 411 displays image data letter "A". In the active display region 411, a black region is all see-through region except for the letter "A".

If the image obscures the user's viewing field, the user may press a zoom-out adjustment button to perform a zoom-out operation on the image data (as shown in FIG. 7B), and the letter "A" in the active coordinate region 412 is zoomed out based on a center of the active coordinate region 412 (as shown in FIG. 7B), and the adjusted image is provided to the active display region 411 of the AR display device 100 (as shown in FIG. 8B). In addition, the user may perform a shift operation on the zoomed-out image data by pressing the shift adjustment button (as shown in FIG. 7C), and the adjusted image is provided to the active display region 411 of the AR display device 100 (as shown in FIG. 8C), and the letter "A" is moved to the lower right corner of the active display region 411.

In summary, the AR display device of the disclosure may zoom in or out the display image and move the image position, may adjust the content of the active display region of the AR display device according to the user's needs, and may move the image to any position to allow the user to further see the content clearly or avoid the display image blocking the user's view. Accordingly, the disclosure is not limited by the mechanism, but may adjust the display image within the virtual adjustment coordinate region.

In addition, AR display devices may be further applied in medical systems. When a doctor wears an AR display device (e.g. AR glasses) to perform an incision, a central region of a lens of the AR glasses needs to be maintained in a see-through state because of the need to focus on a surgical object. In this regard, through the display image adjustment method of the AR display device 100, the user may easily adjust the size and location of the image, and then determine see-through conditions of the active display region. Moreover, through the disclosure, the image data may be replaced with the patient's heart rate graph, blood pressure and other information that can assist the doctor to complete the operation and displayed on the active display region.

The foregoing description of the preferred of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A display image adjustment method for an augmented reality display device, comprising:
    receiving a boot command;
    converting an image data to a coordinate system of the augmented reality display device based on display settings stored in previous shutdown of the augmented reality display device to obtain an initial coordinate information;
    providing an initial image to an active display region of the augmented reality display device based on the initial coordinate information;

adjusting the initial coordinate information in a virtual adjustment coordinate region to obtain an adjusted coordinate information when an adjustment command is received, wherein an active coordinate region corresponds to the active display region, and the active coordinate region is located in the virtual adjustment coordinate region; and providing an adjusted image to the active display region of the augmented reality display device based on the adjusted coordinate information.

2. The display image adjustment method according to claim 1, wherein the adjustment command is a zoom command, and adjusting the initial coordinate information to obtain the adjusted coordinate information comprises:

performing a resolution conversion on the image data to convert the initial coordinate information of a first size to the adjusted coordinate information of a second size.

3. The display image adjustment method according to claim 2, wherein a center point of the initial coordinate information of the first size overlaps a center point of the adjusted coordinate information of the second size.

4. The display image adjustment method according to claim 1, wherein after adjusting the initial coordinate information to obtain the adjusted coordinate information further comprises:

setting a block in the active display region where the adjusted image is not displayed to a see-through state if a size of the adjusted image is smaller than a size of the active display region.

5. The display image adjustment method according to claim 1, wherein an area of the virtual adjustment coordinate region is N times an area of the active coordinate region, 1<N≤9.

6. The display image adjustment method according to claim 1, wherein the adjustment command is a shift command, and adjusting the initial coordinate information to obtain the adjusted coordinate information further comprises:

shifting the initial coordinate information in a moving direction to obtain the adjusted coordinate information.

7. An augmented reality display device comprising:

an image processor configured to receive an image data from a signal source;

an operating unit configured to input an adjustment command;

a controller, coupled to the operating unit and the image processor, and configured to determine whether the operating unit inputs the adjustment command, and transmit the adjustment command to the image processor, wherein the image processor is configured to:

receiving a boot command;

convert the image data to a coordinate system of the augmented reality display device based on display settings stored in previous shutdown of the augmented reality display device to obtain an initial coordinate information;

provide an initial image to an active display region of the augmented reality display device based on the initial coordinate information;

adjust the initial coordinate information in a virtual adjustment coordinate region to obtain an adjusted coordinate information when the adjustment command is received, wherein an area of the virtual adjustment coordinate region is larger than an area of an active coordinate region corresponding to the active display region; and provide an adjusted image to the active display region of the augmented reality display device based on the adjusted coordinate information.

8. The augmented reality display device according to claim 7 further comprising a projection device, wherein the projection device is coupled to the controller for projecting the initial image and the adjusted image.

* * * * *